May 28, 1963

E. M. SCHMIDT 3,091,729

STATIC INVERTER

Filed March 6, 1959

Inventor:
Edward M. Schmidt
By: Ray E. Snyder Atty.

May 28, 1963

E. M. SCHMIDT 3,091,729

STATIC INVERTER

Filed March 6, 1959

Inventor:
Edward M. Schmidt
By: Ray E. Snyder Atty.

United States Patent Office 3,091,729
Patented May 28, 1963

3,091,729
STATIC INVERTER
Edward M. Schmidt, Chicago, Ill., assignor to Borg-Warner Corporation, Chicago, Ill., a corporation of Illinois
Filed Mar. 6, 1959, Ser. No. 797,803
6 Claims. (Cl. 321—5)

This invention relates to a static inverter for producing a polyphase alternating current voltage from a direct current source.

This invention constitutes an improvement to my previously filed application, Serial No. 745,412, filed June 30, 1958, now Patent No. 2,953,735.

Inverters of the vibratory and rotary types are well known in the art. These inverters are known to work satisfactorily for certain applications; however, they have several inherent limitations. Some of these limitations are: low efficiency and excessive weight per watt of power output; they are affected by changes in temperature and environment; the frequency and phase are unstable and are affected by changes in load; and because of their moving parts, they require considerable maintenance.

It is an object of the present invention to provide a static inverter of comparatively light weight that is maintenance free and is unaffected by ordinary environmental changes.

It is another object to provide a static inverter employing a timing generator and a logic control circuit for converting a direct current voltage to a polyphase alternating current voltage.

It is still another object to provide a static inverter employing a plurality of controlled rectifier transistors, a plurality of magnetic shift registers for controlling the conduction of the rectifiers, and a timing pulse generator for controlling the operation of the shift registers.

It is still another object to provide an improved static inverter utilizing a minimum number of components and having stable frequency and phase characteristics that are unaffected by fluctuating load conditions.

The invention consists of the novel constructions, arrangements, and devices to be hereinafter described and claimed for carrying out the above stated objects and such other objects as will appear from the following description of a preferred form of the invention, illustrated with reference to the accompanying drawings, wherein:

Like characters of reference designate like parts in the several views.

Figure 1:
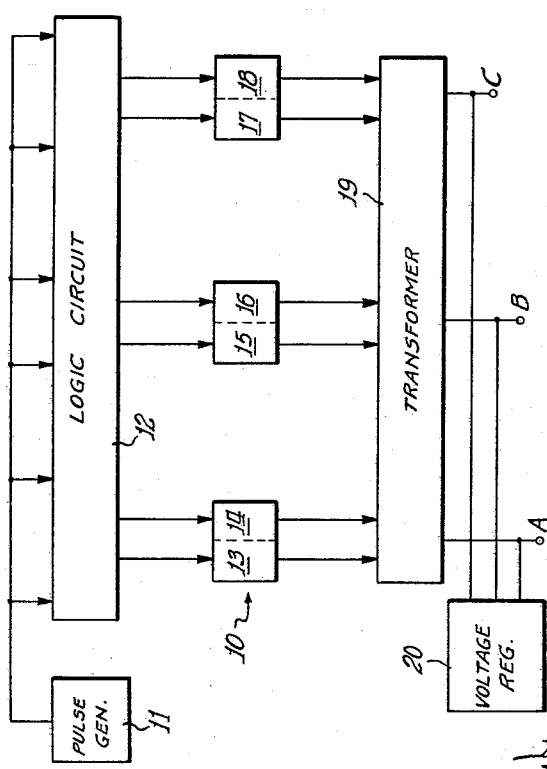
FIG. 1 is a block diagram of the static inverter of the present invention, including a timing pulse generator, a logic control circuit, a plurality of controlled rectifiers, a power transformer, and a voltage regulator.

The static inverter of the present invention, shown in FIG. 1, is designated generally by the numeral 10, and comprises a timing pulse generator 11, a logic control circuit 12, a plurality of controlled rectifier type transistors 13–18, a power transformer 19, and a voltage regulator 20. The output of the pulse generator 11 is connected to the input of the logic control circuit 12. Each of the controlled rectifier circuits 13–18 has an input connection and an output connection with the inputs respectively connected to the logic circuit and the outputs respectively connected to the power transformer 19. The voltage regulator 20 is connected to the output side of the power transformer 19 and functions to control the output voltage under varying load conditions as will be described hereinafter.

Figure 2:
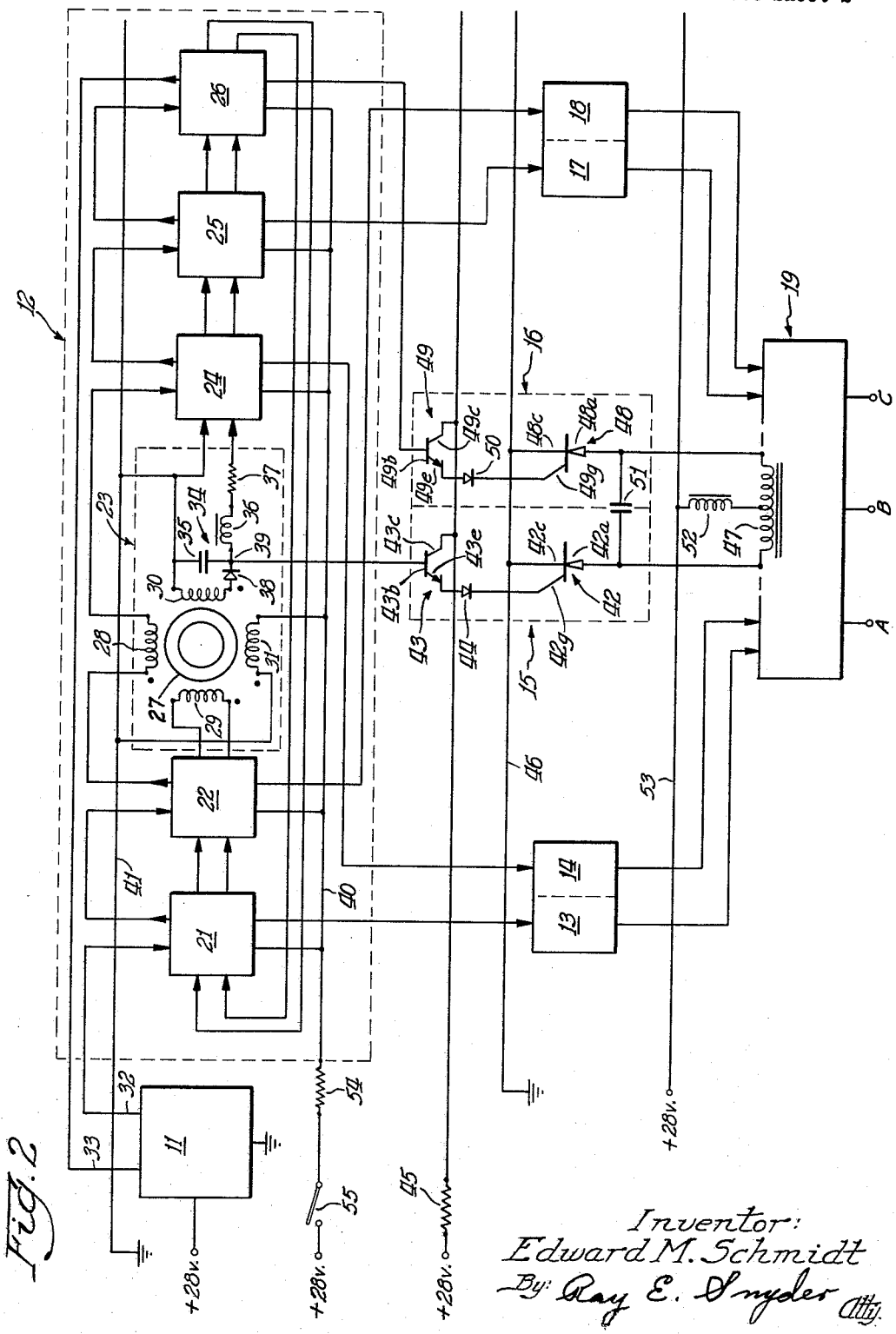
FIG. 2 is a schematic diagram of portions of the static inverter superimposed on the block diagram of FIG. 1.

Referring now to FIG. 2, the logic control circuit is seen to comprise a plurality of magnetic shift registers 21–26. Each of the shift registers has a magnetic core 27 and four windings 28, 29, 30, and 31 which are adapted to affect the magnetic saturation of the core 27. The winding 28 of the shift register 23 constitutes a shift winding and is connected in series with corresponding shift windings for each of the other five shift registers. The timing pulse generator 11 is connected by means of conductors 32 and 33 to the series circuit comprising the shift windings of the several shift registers 21–26. The winding 29 is an input winding and is connected to the output winding 30 of the preceding shift register. The output winding 30 is connected through a temporary storage circuit 34 to the input winding 29 of the following shift register.

The storage circuit 34 comprises a capacitor 35, an inductor 36, a resistor 37, and a diode 38. One end of the coil 30 is connected through the series circuit of the diode 38, the inductor 36 and resistor 37 to one end of a winding 29 in the shift register 24. A capacitor 35 connects the other end of the winding 30 to a junction 39 between the diode 38 and coil 36. The junction 39 constitutes an output connection which leads to an input of the controlled rectifier circuit 15. The winding 31 constitutes a reset winding which is connected between a direct current power line 40 and a ground line 41. Corresponding windings 31 for each of the other shift registers are also connected in parallel between the lines 40 and 41. The polarity of the windings 31 for five of the shift registers is in the same direction and the polarity of the sixth reset winding 31 is reversed.

The circuit for each of the controlled rectifiers 13–18 comprises a controlled rectifier type transistor 42, a buffer transistor 43, and a diode 44. The transistor 43 has a base 43b, an emitter 43e, and a collector 43c. The base 43b is connected to the junction 39 of the shift register 23. The emitter 43e is connected to the anode of the diode 44, and the collector 43c is connected through a resistor 45 to a positive D.C. source. The controlled rectifier transistor 42 has an anode 42a, a cathode 42c and a gate 42g. The gate 42g is connected to the cathode of the diode 44. The cathode 42c is connected to a ground line 46, and the anode 42a is connected to one end of a primary winding 47 of the power transformer 19.

The circuit for the controlled rectifier 16 comprises a controlled rectifier type transistor 48, a buffer transistor 49, and a diode 50. The buffer transistor 49 has a base 49b connected to the output of the shift register 26, a collector 49c connected through the resistor 45 to the D.C. source, and an emitter 49e connected to the anode of the diode 50. The controlled rectifier transistor 48 comprises an anode 48a, a cathode 48c, and a gate 48g. The gate 48g is connected to the cathode of the diode 50, the cathode 48c is connected to the ground line 46, and the anode 48a is connected to the other end of the power transformer winding 47. A commutating capacitor 51 is connected between the anodes 42a and 48a. A shaping coil 52 is connected between a center tap of the winding 47 and a positive D.C. line 53. Accordingly lines 46 and 53 comprise means for applying a D.C. voltage to the controlled rectifiers 15 and 16 to energize these current conducting means.

To complete the circuit for the static inverter 10, the output of the shift register 21 is connected to the input of the rectifier 13; the output of the shift register 22 is connected to the input of the rectifier 18; the output of the shift register 24 is connected to the input of the rectifier 14; the output of the shift register 25 is connected to the input of the rectifier 17; and the output of the rectifier 26 is connected to the input of the rectifier 16. The controlled rectifiers 13 and 14 and 17 and 18 are operable in pairs, as are the controlled rectifiers 15 and 16. The outputs of the rectifiers 13 and 14 and of the rectifiers 17 and 18 are respectively connected to primary windings of the power transformer 19. The reset line 40 is connected through a resistor 54 and a reset switch 55 to a positive D.C. source.

In operation, the gate circuit means or shift registers 21 and 26 are initially conditioned for operation by momentarily closing the reset switch 55. Closing the reset switch 55 allows the current to flow through each of the reset windings 31, saturating the respective cores 27. Each of the core 27 is saturated in the same direction except for the one for which the polarity of the reset winding 31 is reversed.

The timing pulse generator 11 provides an output in the form of a series of narrow pulses of one polarity which are fed through the conductors 32 and 33 and through the series of shift windings 28 of the shift registers 21–26. Depending upon the direction of saturation of flux within each of the cores 27, each pulse will either switch the core 27 or leave it in its previously saturated condition. Only one of the cores 27 will be shifted by each of the pulses. Shifting the direction of saturation of the core 27 induces a voltage in a winding 30 which is applied through a diode 38 to a controlled rectifier circuit, and through a temporary storage circuit 34 to the input winding 29 of the succeeding shift register. The storage circuit 34 functions to delay the transfer of energy to the input coil 29 of the succeeding shift register until the particular triggering pulse from the generator 11 has terminated. The voltage applied from the output winding 30 to the succeeding input winding 29 conditions the respective core 27 for shifting by the next pulse from pulse generator 11. As each of the shift registers is shifted, the output pulse supplied therefrom is effective to change the state of conduction of a connected controlled rectifier circuit.

The output pulse from the junction 39 to the base 43b of the transistor 43 is transmitted through the transistor 43 and the diode 44 to the gate 42g of the controlled rectifier transistor 42. This incoming pulse is effective to switch the transistor 42 from a state of non-conduction to a state of conduction. As the transistor 42 is triggered into conduction, the voltage at the anode 42a drops abruptly, which voltage is applied through the capacitor 51 to the anode 48a, switching the transistor 48 from a conducting condition to a non-conducting condition. The substantial change in voltage at the anode 42a causes current to flow from the D.C. line 53 through the shaping coil 52 and the primary winding 47. Current flowing through the primary winding 47 induces a voltage in the secondary of the power transformer 19 as will be described hereinafter.

It should be noted, considering the shifting of all six registers 21 to 26, to constitute a complete cycle of operation, that each shift register 21–26 is effective to control the conduction of one of the rectifiers 13–18 for 60° of the cycle. In this regard, it should be noted that the shift register 23 is connected to the input of the rectifier 15 and the shift register 26 is connected to the rectifier 16 so that their conduction is 180° out of phase with each other. Similarly, the rectifiers 13 and 14 are connected to the registers 21 and 24 respectively, and the rectifiers 17 and 18 are connected to the registers 25 and 22 respectively. Moreover, the conduction of the rectifiers 13 and 14 is 120° out of phase with the conduction of the rectifiers 15 and 16 and, correspondingly, also 120° out of phase with the conduction of the rectifiers 17 and 18.

Figure 3:
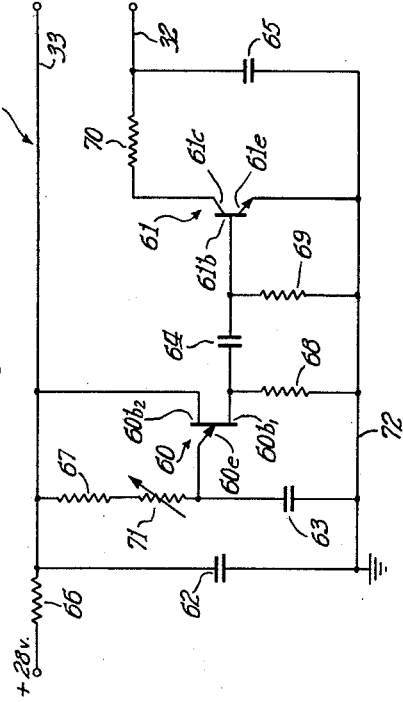
FIG. 3 is a schematic diagram of the timing pulse generator.

Referring now to FIG. 3, there is illustrated a schematic diagram of a circuit that may be utilized for the timing pulse generator 11. The circuit comprises a unijunction transistor 60, a driver transistor 61, capacitors 62, 63, 64, and 65, resistors 66, 67, 68, 69, and 70, and a variable resistor 71. One end of the resistor 66 is connected to a positive D.C. source and the other end is connected to the conductor 33. The capacitor 62 is connected between the conductor 33 and a ground line 72. The resistor 66 and capacitor 62 comprise an input filter for the D.C. voltage supplied to the pulse generator 11. The resistor 67, variable resistor 71, and capacitor 63 are connected in series between the conductor 33 and the ground line 72. The uni-junction transistor 60 has an emitter $60e$ and two bases $60b_1$ and $60b_2$. The emitter $60e$ is connected to a junction between the variable resistor 71 and the capacitor 63. The base $60b_2$ is connected to the conductor 33, and the base $60b_1$ is connected through the resistor 68 to the ground line 72. The base $60b_1$ is also connected through a capacitor 64 and resistor 69 to the ground line 72. The transistor 61 has a base $61b$, a collector $61c$, and an emitter $61e$. The base $61b$ is connected to a junction between the capacitor 64 and resistor 69; the collector $61c$ is connected through the resistor 70 to the conductor 32; and the emitter $61e$ is connected directly to the ground line 72. The capacitor 65 is connected between the conductor 32 and ground line 72.

In operation, the circuit functions as follows: A positive D.C. voltage is supplied from the source through the resistor 66 to the conductor 33. The positive voltage appearing on the conductor 33 is applied to the base $60b_2$. The transistor 60 has a negative resistance characteristic, and within a certain operating range it has a state of low or negligible conduction and a state of high conduction. Current flowing from the line 33 through the resistors 67 and 71 charges the capacitor 63 and produces an increase in the voltage appearing at the emitter $60e$. When the voltage at the emitter $60e$ reaches a predetermined magnitude, the transistor 60 switches from its state of low conduction to its state of high conduction. In the state of high conduction, current flowing through the base $60b_1$ develops a comparatively large positive voltage across the resistor 68. This voltage is applied through the capacitor 64, transistor 61, and resistor 70 to the conductor 32. The transistor 61 functions to amplify the voltage developed across the resistor 68. When the transistor 60 is switched into a state of high conduction, the capacitor 63 is discharged through the emitter $60e$ and base $60b_1$ and when the voltage drops to a predetermined magnitude, the transistor shifts back from its state of high conduction to its state of low conduction. The cycle is then repeated and the output developed is in the form of a series of narrow pulses which are applied through the conductors 32 and 33 to the shift windings 28 of the shift registers 21–26. The frequency generated by the pulse generator 11 is determined by the time constant of the combined values of resistor 67 and the effective portion of variable resistor 71 and the capacitor 63.

Figure 4:
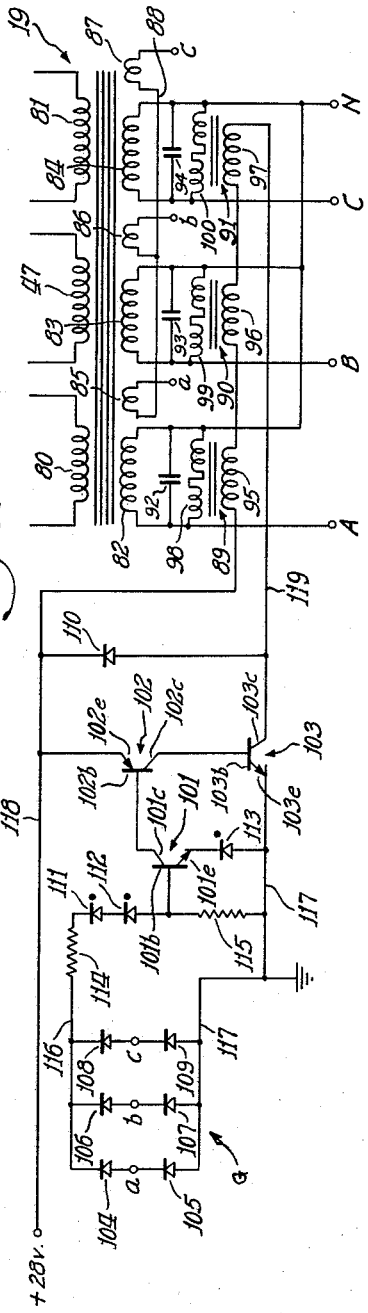
FIG. 4 is a schematic diagram of the voltage regulator and power transformer.

Referring now to FIG. 4, there is illustrated a schematic diagram of the voltage regulator 20 as utilized with the power transformer 19. The power transformer 19 comprises three primary windings, 47, 80, and 81, and secondary windings 82, 83, and 84. One end of each of the secondary windings 82–84 is connected to a common terminal designated by N. The other ends of each of the secondary windings 82–84 comprise the output terminals designated as A, B, and C, respectively.

Three input or ternary windings for the voltage regulator 20 are provided in the secondary of the transformer 19 and are designated by numerals 85, 86, and 87. One end of each of the windings 85–87 is connected to a common tie-line 88. The other ends of each of the windings 85–87 constitute the input connections to the voltage regulator 20 and are designated as $a$, $b$, and $c$, respectively. The voltage regulator circuit also comprises three saturable reactors 89, 90, and 91, and three capacitors 92, 93, and 94. The capacitors 92, 93, and 94 are connected across the secondary windings 82, 83, and 84, respectively. The saturable reactors 89–91 each have control windings 95, 96, and 97, respectively, and secondary windings 98, 99, and 100. Each of the secondary windings 98–100 comprises two coils connected in series which are wound in opposition to each other so that there is zero induced voltage in the control windings. Also, each of the secondary windings 98–100 is connected in parallel with the secondary windings 82–84, respectively.

It is also contemplated that the saturable reactors 89–91 and capacitors 92–94 may either be connected across the primary windings 47, 80, and 81 or across the secondary windings 82–84. Moreover, the secondary windings 82–84 may also be used as input windings to the voltage regulator 20 in place of the ternary windings 85–87.

The voltage regulator 20 also comprises three transistors 101, 102, and 103, diodes 104, 105, 106, 107, 108, 109, and 110 and three Zener diodes 111, 112, and 113, and resistors 114 and 115. The diodes 104–109 collectively comprise a bridge rectifier designated generally by the letter G. The diodes 104 and 105 are connected in series between a tie-line 116 and a ground line 117. The pairs of diodes 106 and 107, and 108 and 109 are similarly connected. The junction between each pair of diodes is connected to the points a, b, and c respectively.

The transistor 101 has a base 101b, a collector 101c, and an emitter 101e. The base 101b is connected through the series circuit of Zener diodes 112, 111, and resistor 114 to the tie-line 116. The base 101b is also connected through the resistor 115 to the ground line 117. The emitter 101e is connected through the diode 113 to the ground line 117. The transistor 102 has a base 102b, a collector 102c, and an emitter 102e. The base 102b is connected to the collector 101c, and the emitter 102e is connected to a positive D.C. line 118. The transistor 103 has a base 103b, a collector 103c, and an emitter 103e. The base 103b is connected to the collector 102c, the emitter 103e is connected to the ground line 117, and the collector 103c is connected through a conductor 119 to one end of the winding 97. The windings 95, 96, and 97 are connected in series between the D.C. line 118 and the conductor 119. The diode 110 is also connected between the D.C. line 118 and the conductor 119.

In operation, currents flowing through the primary windings 47, 80, and 81 of the power transformer 19 induce voltages in the secondary windings 82, 83, and 84, and in the ternary windings 85, 86, and 87. The output voltages from the windings 82, 83, and 84 are taken from the points a, b, and c. The voltages developed in the ternary windings 85–87 are applied through the bridge rectifier G through the resistor 114 and diodes 111 and 112 to the base 101b of the transistor 101. The voltage applied to the base 101b is a rectified average of the three phase output from the ternary windings 85–87. The Zener diodes 111–113 collectively provide a D.C. reference voltage with which the rectified average voltage is compared for establishing a difference voltage. This difference voltage applied to the base 101b is amplified by the transistors 101, 102, and 103. The difference between the average rectified voltage and the reference level established by the Zener diodes 111–113 controls the amount of current flowing through the windings 95–97. Current flowing through the control windings 95–97 changes the inductance of the saturable reactors 89–91, respectively.

The secondary windings 98–100 as affected by the control windings 95–97 and the capacitors 92–94, respectively, cooperate to provide a constant power factor to the output terminals A, B, and C. The voltage regulator circuit 20 thereby provides a constant output voltage, notwithstanding varying load conditions.

The components utilized in the circuits shown and described above preferably may be of the types or have values as follows.

Shift register 23 (FIG. 2):
   Core 27 _____ 10 wrap 1 mil Deltamax tape on A22 bobbin.
   Shift winding 28 _____ 20 turns.
   Input winding 29 _____ 40 turns.
   Output winding 30 _____ 40 turns.
   Reset winding 31 _____ 10 turns.
   Capacitor 35 _____ .038 mfd.
   Inductor 36 _____ 9.7 mh.
   Resistor 37 _____ 300 ohms.
   Silicon diode 38 _____ HD6751.

Controlled rectifier circuit 15—16 (FIG. 2):
   Controlled rectifiers 42, 48 _____ C35A.
   Transistors 43, 49 _____ 2N656.
   Silicon diodes 44, 50 _____ HD6751.
   Capacitor 51 _____ 8 mfd.

Pulse generator 11 (FIG. 3):
   Unijunction transistor 60 _____ 2N491.
   Transistor 61 _____ 2N656.
   Capacitor 62 _____ 50 mfd.
   Capacitor 63 _____ .04 mfd.
   Capacitor 64 _____ .25 mfd.
   Capacitor 65 _____ .01 mfd.
   Resistor 66 _____ 120 ohms.
   Resistor 67 _____ 10K ohms.
   Resistor (sensistor) 68 _____ 120 ohms.
   Resistor 69 _____ 150 ohms.
   Resistor 70 _____ 10 ohms.
   Variable resistor 71 _____ 0 to 5K ohms.

Voltage regulator 20 (FIG. 4):
   Saturable reactors 89, 90, 91 _____
   Transistor 101 _____ 2N656.
   Transistor 102 _____ HA7505.
   Transistor 103 _____ 2N389.
   Silicon diodes 104–109 _____ HD6751.
   Silicon diode 110 _____ WE302A.
   Zener diode 111 _____ 11 volts.
   Zener diode 112 _____ 11 volts.
   Zener diode 113 _____ 8 volts.
   Resistor 114 _____ 100 ohms.
   Resistor 115 _____ 1K ohms.

It is contemplated that the entire inverter 10, with the exception of the input and output terminals, may be mounted on printed circuits and sealed within a suitable container and potted with paraffin or other suitable potting material. Such a construction should render the circuit relatively free from environmental conditions and substantially shockproof.

There has been provided by this invention a new and improved static inverter which is capable of converting a direct current voltage into a polyphase alternating voltage. This inverter is light in weight, highly efficient, and has reliability unsurpassed by any comparable device.

It is to be understood that this invention is not to be limited to the specific constructions and arrangements shown and described except only insofar as the appended claims may be so limited, as it will be apparent to those skilled in the art that changes may be made without departing from the principles of the invention.

I claim:

1. In an electrical circuit for converting direct current voltage into alternating current voltage, the combination of controlled current conducting means, means for applying a direct current voltage to said conducting means to energize the same, gate circuit means coupled to said conducting means for operating the same, means in said gate circuit means for conditioning said gate circuit means for operation in sequence, time delay means in said gate circuit means for delaying the conditioning thereof, and timing generator means coupled to said gate circuit means for triggering the conditioned gate circuit means into operation.

2. In an electrical circuit for converting direct current voltage into alternating current voltage, the combination of a plurality of controlled current conducting means; means for applying a direct current voltage to said conducting means to energize the same; a plurality of magnetic shift registers coupled to said conducting means for operating the same, each of said shift registers comprising a magnetic core, an input winding for magnetizing said core, an output winding operative in response to a change in magnetization of said core to provide a control signal, and a shift winding coupled to said core for changing the direction of magnetization thereof; means for applying said control signal both to one of said conducting means and to an input winding of a succeeding shift register; and timing generator means coupled to said shift windings for energizing them.

3. In a static inverter, the combination of a plurality of controlled rectifier circuits; means for applying a direct current voltage to said controlled rectifier circuits to energize the same; a plurality of magnetic shift registers coupled to said rectifier circuits for operating same; timing generator means coupled to said shift registers to operate said registers in accordance with a predetermined sequence, said shift registers each comprising a magnetic core, an input winding for magnetizing said core, an output winding operative in response to a change in magnetization of said core to provide a control signal, a shift winding coupled to said timing means for changing the magnetization of said core, and a reset winding also coupled to said core; means for applying said control signal both to one of said rectifier circuits and to an input winding of another shift register; and means for energizing said reset windings for establishing the initial operating conditions of said shift registers.

4. In an electrical circuit for converting direct current voltage into alternating current voltage, the combination of a plurality of controlled current conducting means; means for applying a direct current voltage to said conducting means to energize same; a plurality of magnetic shift registers coupled to said conducting means for operating same; timing generator means coupled to said shift registers to operate them, each of said shift registers comprising a magnetic core, an input winding for magnetizing said core, an output winding operative in response to a change in the magnetization of said core to provide a control signal, and a shift winding coupled to said timing means for changing the magnetization of said core; means for applying said control signal to one of said conducting means; and time delay or temporary storage means intercoupling an output winding of one shift register with an input winding of another shift register.

5. In a polyphase static inverter for converting direct current voltage received over an input circuit into three phase alternating current voltage, the combination of three pair of controlled rectifier circuits; means for applying a direct current voltage to said rectifier circuits to energize the same; six magnetic shift registers coupled to said rectifiers in a predetermined manner; a timing pulse generator circuit coupled to said shift registers to effect operation thereof, each of said shift registers comprising a magnetic core, an input winding for magnetizing said core, an output winding for detecting a change in the direction of magnetization of said core and coupled both to one of said rectifier circuits and to an input winding of a succeeding shift register, a reset winding for coupling to said input circuit for establishing the initial direction of magnetization of each of said cores, and a shift winding coupled to said timing pulse generator circuit for shifting the direction of magnetization of said core for thereby controlling the conduction of one of said rectifier circuits.

6. In a static inverter including translation means for providing an A.C. output signal responsive to receipt of D.C. pulse signals, the combination of a plurality of selective conduction means coupled to said translation means, a like plurality of gate circuits, each gate circuit being conditioned upon receipt of an output signal from a preceding gate circuit to operate at a later time determined by receipt of a control signal and produce an output signal, a first output circuit intercoupled between each of said gate circuits and one of said selective conduction means to pass an output signal between one gate circuit and the associated conduction means and thus provide a D.C. pulse signal to the translation means, a second output circuit including time delay means intercoupled between each gate circuit and the next successive gate circuit operative to delay by a given time interval the passage of the output signal from one gate circuit to the next successive gate circuit, and timing generator means coupled to each of said gate circuits operative to simultaneously apply a control signal to each gate circuit, the time duration of said control signal being less than said given time interval, thereby providing an output signal from the gate circuit previously conditioned for operation and conditioning the next successive gate circuit for operation upon receipt of the next control signal.

References Cited in the file of this patent

UNITED STATES PATENTS

| 1,904,455 | Hazeltine | Apr. 18, 1933 |
| 2,548,737 | Morris | Apr. 10, 1951 |
| 2,567,410 | Trousdale | Sept. 11, 1951 |
| 2,734,164 | Knowlton | Feb. 7, 1956 |
| 2,824,274 | Holt | Feb. 18, 1958 |
| 2,885,627 | Holt | May 5, 1959 |
| 2,912,634 | Peoples | Nov. 10, 1959 |
| 2,916,687 | Cronin | Dec. 8, 1959 |

OTHER REFERENCES

"Transistorized Three-Phase Power Supplies," by W. Brannian, published in Electronic Industries (January 1959), pp. 2–5.